United States Patent [19]
Wildermuth

[11] Patent Number: 5,950,188
[45] Date of Patent: Sep. 7, 1999

[54] DATABASE SYSTEM WITH METHODS FOR EXECUTING SYSTEM-CREATED INTERNAL SQL COMMAND STATEMENTS

[75] Inventor: Elton P. Wildermuth, Oakland, Calif.

[73] Assignee: Sybase, Inc., Emeryville, Calif.

[21] Appl. No.: 08/752,677

[22] Filed: Nov. 19, 1996

Related U.S. Application Data

[60] Provisional application No. 60/031,107, Nov. 14, 1996.

[51] Int. Cl.[6] .................................................. G06R 17/30
[52] U.S. Cl. ................................. 707/3; 707/9; 707/10; 707/200
[58] Field of Search .................................. 707/3, 4, 5, 6, 707/100, 200, 10, 9

[56] References Cited

U.S. PATENT DOCUMENTS

| | | | |
|---|---|---|---|
| 5,457,792 | 10/1995 | Virgil et al. | 395/600 |
| 5,537,622 | 7/1996 | Baum et al. | 395/800 |
| 5,584,024 | 12/1996 | Shwartz | 395/604 |
| 5,584,769 | 12/1996 | Baum et al. | 395/800 |
| 5,600,833 | 2/1997 | Senn et al. | 395/601 |
| 5,630,125 | 5/1997 | Zellweger | 395/614 |
| 5,664,173 | 9/1997 | Fast | 395/604 |

*Primary Examiner*—Paul V. Kulik
*Assistant Examiner*—Michael J. Wallace, Jr.
*Attorney, Agent, or Firm*—John A. Smart

[57] ABSTRACT

A Client/Server Database system is described which includes a Database Server providing methods for executing system-created internal command statements (e.g., SQL statements), such as those which ordinarily are submitted to the server by various Clients. The Database Server is modified so that it can be its own "user," thus removing the fundamental schism which had existed in prior systems. The system is allowed to issue SQL commands to itself and, thus, can do anything that either the system or the user can do. The methodology is particularly useful for carrying out upgrades. The system can now set flags that are not accessible to users. Unlike a standalone "utility" approach, however, authentication is assured. Here, the system is assured that a known user—itself—has issued the command. As a result, it is no longer necessary to expose "dangerous" system functions to users.

20 Claims, 3 Drawing Sheets

DATABASE SYSTEM WITH METHODS FOR EXECUTING SYSTEM-CREATED INTERNAL SQL COMMAND STATEMENTS

The present application claims priority from and is a continuation-in-part application of commonly-owned provisional patent application, naming Elton Wildermuth as inventor and entitled DATABASE SYSTEM WITH METHODS FOR EXECUTING SYSTEM-CREATED INTERNAL SQL COMMAND STATEMENTS, Ser. No. 60/03/107, filed Nov. 14, 1996, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to employing user-directed services for controlling system operation in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems,* Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

Today, a schism exists in SQL database systems between "users" and "system." Users communicate with a SQL database server by issuing SQL commands. Often, a database vendor will provide an enhanced SQL syntax, such as TRANSACT-SQL (T-SQL) commands found in Sybase SQL Server. For its part in processing such commands, an SQL database server system may be viewed as a set of purpose-written functions, each of which accomplishes one task.

Both sides of this schism are inherently limited, since neither is all inclusive. In Sybase SQL Server, for instance, T-SQL cannot accomplish certain system tasks, such as formatting pages or directly accessing the system's transaction log. Further, purpose-written functions cannot construct and execute general-purpose queries. For example, system functions cannot process queries with either UNION or OR clauses. Additionally, because system functions are purpose-written, one must write a new function for every new purpose —the existing code cannot adapt to a different purpose.

Because of these limitations, present-day systems are inherently inflexible: the various pieces of these systems are limited by the support which has been built in for them. For instance, one area which is particularly limited is that of "upgrading"—that is, updating an existing installation so that it is usable by a newer version of the SQL database server (e.g., SQL Server). This problem will now be described in further detail.

With each new version of an SQL database server released, users must face the problematic task of upgrading existing databases. Often, the task requires adding new tables to the system. Existing tables and accompanying data structures often are changed as well. Changes may even be so drastic that the database system needs to update every data page in the user's database (i.e., rewrite these basic storage units which store tuple or record information).

In the past, one approach to addressing these problems was to employ a separate executable, an "upgrade utility." This standalone program had the task of collecting the knowledge of everything which changed between the different versions of the database server and issuing SQL command statements in order to effect the necessary changes. The approach was in itself problematic. Here, the utility ran as a "user," despite the fact it was inherently a highly-privileged user. This leads to further disadvantages. Upgrade steps were limited to that collection of things which could be expressed as SQL statements. If a task were not easily expressible as SQL, the database vendor had to extend the SQL grammar (e.g., Sybase T-SQL) with special statements to enable that task. Secondly, the SQL interface exposed internal information to customers. Because of the grammar extensions, customers could gain access to protected system functions and language extensions. This decreases system security, exposing the database to increased risk of extensive damage due to malicious or foolish tampering. Finally, the utility approach provided no authentication. Any user task that presented the correct profile to the database server was accepted as the "upgrade" task. Again, this compromises security, for instance, allowing a random user to masquerade as a privileged system task.

What is needed are methods providing some crossover between "users" and "system" parts in a database system. Preferably, such methods would be implemented by adapting existing machinery in current database systems. The present invention fulfills this and other needs.

SUMMARY OF THE INVENTION

The present invention comprises a Client/Server Database System having a Database Server providing methods for executing system-created internal command statements (e.g., SQL statements), such as those which ordinarily are submitted to the server by various Clients. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands. Typical SQL commands specify "queries"—criteria for selecting records of a table for a particular operation (e.g., updating).

During system operation, the SQL statements received from the one or more Clients are processed by an Engine of the Database Server. The Engine itself comprises a Parser, a Normalizer, a Compiler, an Execution Unit, and Access Methods. Specifically, the SQL statements are passed to the Parser which converts the statements into a query tree—a binary tree data structure which represents the components of the query in a format selected for the convenience of the system.

The Code Generator ultimately converts the query tree into a set of instructions suitable for satisfying the query. These instructions are passed to the Execution Unit. Operating under the control of these instructions, the Execution Unit generates calls into lower-level routines, such as the Access Methods, for carrying out the query-specified operation, such as fetching relevant information (e.g., a row) from a database table. After the plan has been executed by the Execution Unit, the Server returns a query result or answer table back to the Client(s).

According to the present invention, the Database Server is modified so that it can be its own "user," thus removing the fundamental schism which had existed in prior systems. In the currently-preferred embodiment, the present invention is implemented by modifying an existing SQL database server, such as Sybase SQL Server. Since an existing SQL database server includes a parser, query optimizer, and execution engine already in place to service "user" SQL commands, the system of the present invention may be implemented by modifying an existing SQL database server to provide command text in a manner similar to that done by users. If the system is allowed to issue SQL commands to itself, the system is allowed, by extension, to do anything that either the system or the user can do, thus removing prior inherent limitations of the users/system schism.

This approach is particularly useful for carrying out upgrades. The database system can now set flags that are not accessible to users. Unlike a standalone "utility" approach, however, authentication is assured. Here, the system is assured that a known user —itself—has issued the command. As a result, it is no longer necessary to expose "dangerous" system functions to users. Although the database system, once modified, has access to the full range of SQL capabilities, not every required capability need be built into the SQL syntax (e.g., T-SQL). Instead, the system can fall back on purpose-written code for those areas where it is appropriate.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
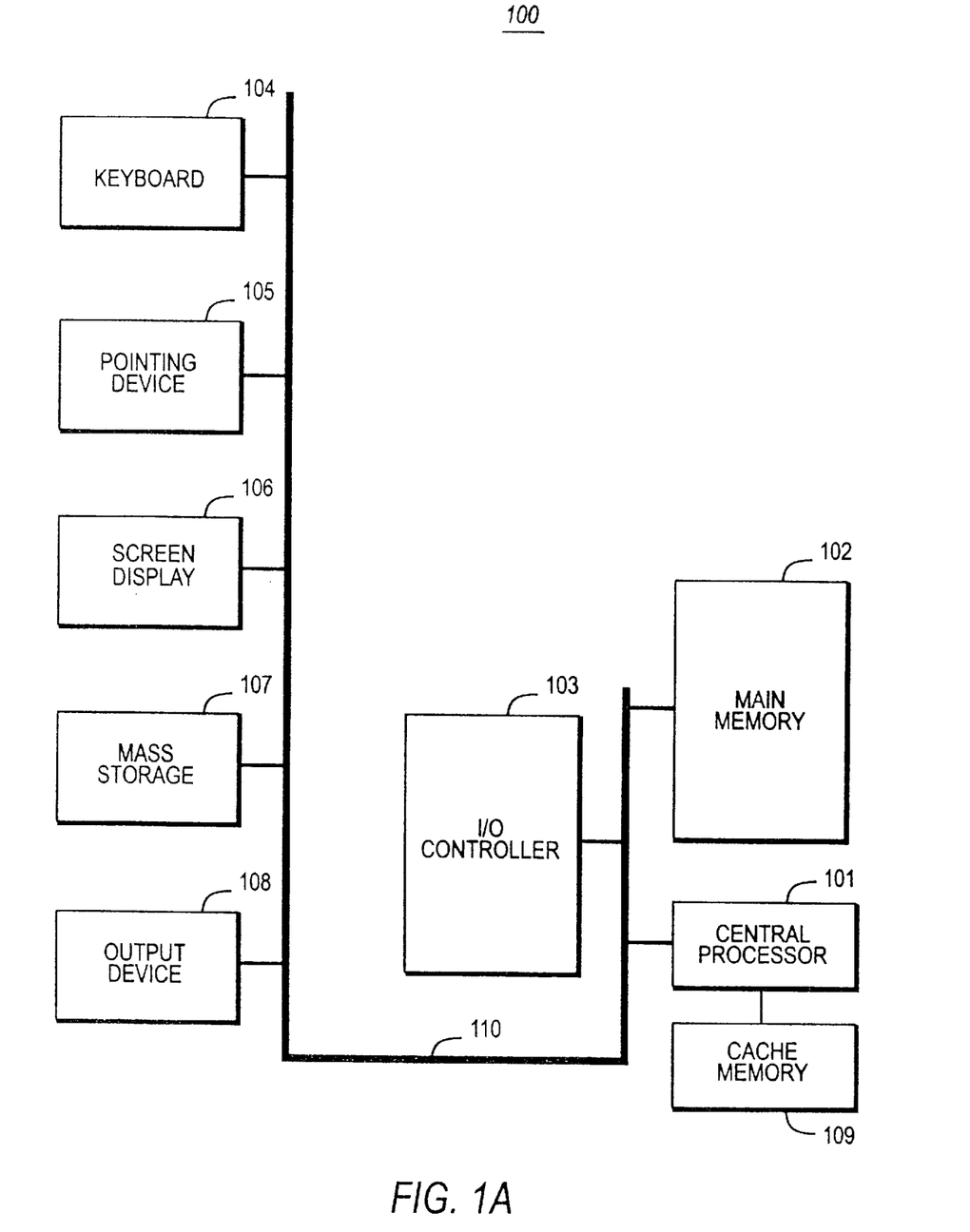
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
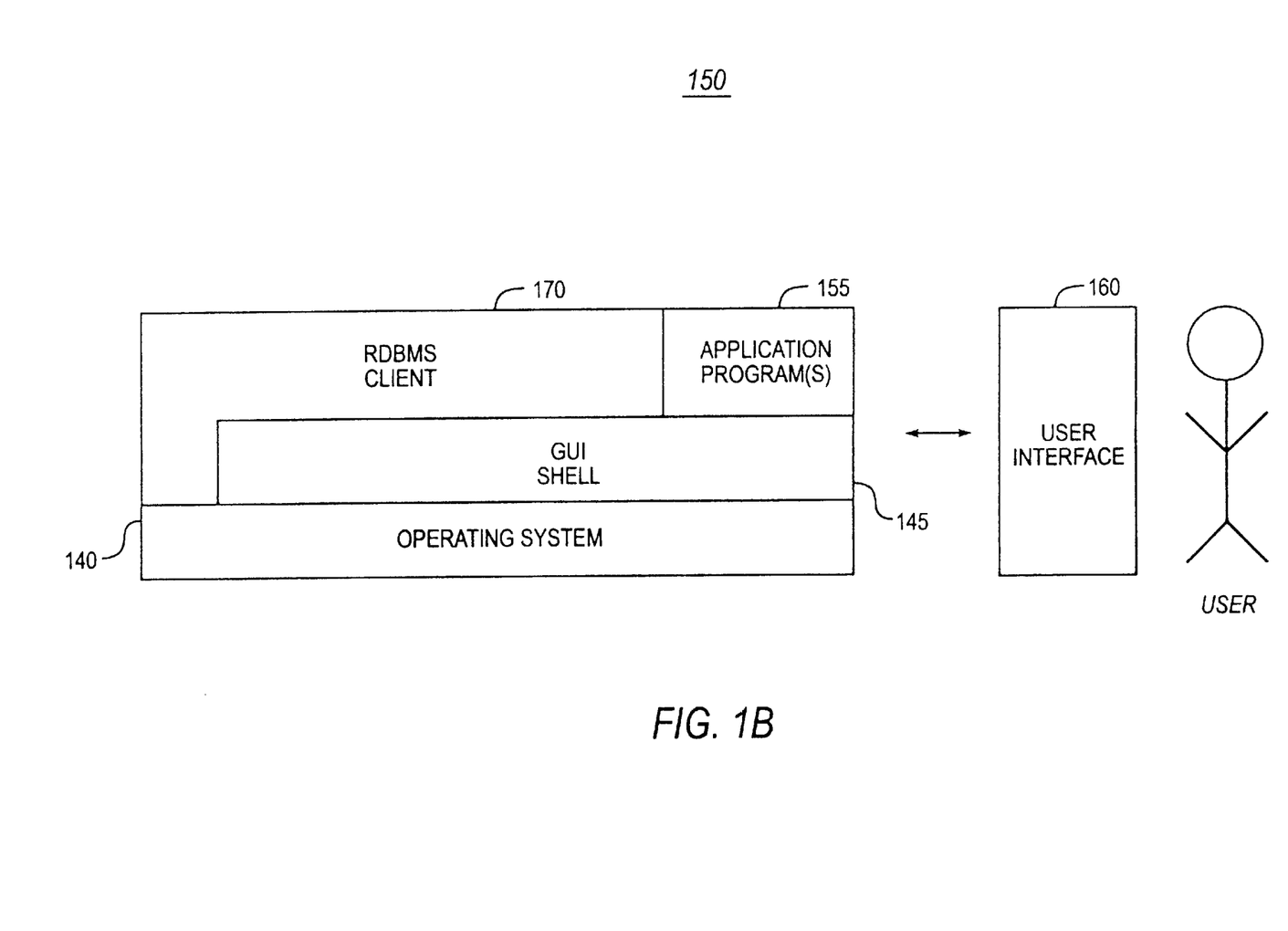
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE°, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2:
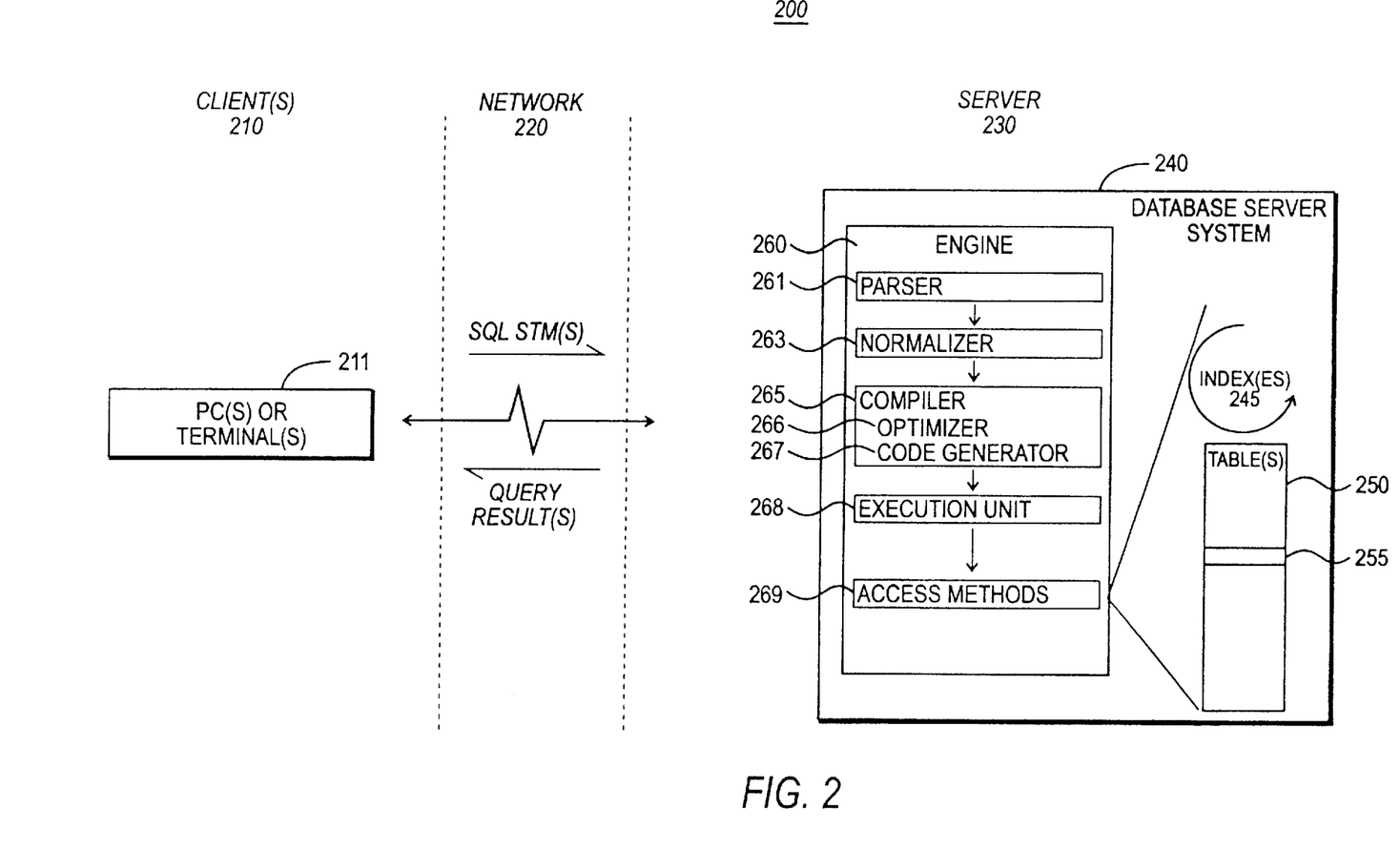
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server,* Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare,* Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems.* In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by Engine 260 of the Database Server System 240. The Engine 260 itself comprises a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow. Before describing the methods of the present invention for improving the updating of records (i.e., "update queries"), it is helpful to examine further the general methodology for storing and indexing data records in a database system.

Modification of database system to provide "system " user

A. Overview

According to the present invention, the SQL database server system is modified so that it can be its own "user," thus removing the fundamental schism which had existed in prior systems. If the system is allowed to issue SQL commands to itself, the system is allowed, by extension, to do anything that either the system or the user can do, thus removing prior inherent limitations of the users/system schism.

Moreover, the approach is particularly useful for carrying out upgrades. The database system can now set flags that are not accessible to users. Unlike the standalone "utility" approach, however, authentication is assured. Here, the system is assured that a known user—itself—has issued the command. As a result, it is no longer necessary to expose "dangerous" system functions to users. Although the database system, once modified, has access to the full range of SQL capabilities, not every required capability need be built into the SQL syntax (e.g., T-SQL). Instead, the system can fall back on purpose-written code for those areas where it is appropriate.

B. System Implementation

In the currently-preferred embodiment, the present invention is implemented by modifying an existing SQL database server, such as Sybase SQL Server. Since an existing SQL database server includes a parser, query optimizer, and execution engine already in place to service "user" SQL commands (as previously described above), the system of the present invention may be implemented by modifying an existing SQL database server to provide command text in a manner similar to that done by users.

In the system of the present invention, two new functions are provided to accomplish the task. The first function begins the process, by providing the first "packet" of the command. As SQL database servers are network-oriented systems, they expect to receive input as packets transmittable across a network (as opposed to receiving it as long text strings). The second function provides the "next" input packet; this function also has the task of recognizing "end-of-input" and signaling that to the parser.

In the currently-preferred embodiment, no "next" packet is employed. Instead, design is simplified by having a "next" input function that simply signals "end-of-input." For a more complex embodiment, the design may be enhanced by providing a context storage area, which allows one to provide multi-packet commands. In this manner, commands can be used which would otherwise be too long to provide as a single string. The very same context can be employed to support parallel processing: parsing can begin on the command as soon as the first part of the command is known, while the remaining parts of the command can be provided via the next-input function as they are discovered.

Another capability implemented in the modified database server is the ability to switch between command I/O (input/output) functions quickly and easily. Here, the system uses its normal network I/O functions when accepting user input yet, at the same time, can switch to its internal-user functions when it encounters a command requiring it to formulate other commands for itself, and then switch back to normal functions in order to accept the "next" user command batch.

A final design element preferably incorporated into the modified system is augmentation of the database server's security-checking mechanism. Specifically, the database server now provides a new security flag for identifying a command as having come internally from the system. In this manner, the present invention can be implemented from an existing database server by identifying places in its code base which require special access considerations and re-coding those places to accept the new flag as identifying a suitably-privileged user.

In the preferred embodiment, output redirecting functions are provided (as described below), thereby allowing the system to receive and correctly process returned results (in a manner analogous to how a user might process such results). In a most-preferred embodiment, a context memory (data structure) is created for holding the returned results, row by row, and for providing those result rows to the system for its internal use. In less sophisticated embodiments, the return results can be sent via the network to the user who initiated the original command which spawned the system internal command. In the event that no such user exists, the result rows can be simply discarded, with appropriate error tracking messages written to an error log (as desired).

When result rows are stored to a context memory, the system can distribute those results in machine-readable form within the database server itself. This is useful for several reasons. For instance, commands can be parallelized by distributing the results of internal queries to worker threads, one row per thread. Also, enhancements to the system can be made by simply modifying SQL text, rather than rewriting and recompiling program code; thus, modifications become very easy to implement and, further, such modifications are guaranteed correct so long as the SQL commands themselves can be proven correct. The statements necessary to accomplish standard system tasks can be stored in database tables, rather than generated internally. Accordingly, certain types of upgrades can be performed on-line —while the server is running—without having to provide a new binary (file set). Finally, an SQL database server can be "taught" to upgrade itself from a maintenance version of an older server, even though the maintenance version did not exist when the newer server was released.

Security and authentication can be preserved using two-key encryption. For instance, commands can be stored in database tables or provided as text files to customers in a form which is encrypted with a vendor-provided public key, then decrypted with a public key (which need not even be known to customers). By enabling an SQL database server to formulate SQL commands, the server can not only function as its own internal "user" but may also function as a "user" of another server. Here, one SQL database server issues commands to another (or more) SQL database server and receives results from that other server. This allows the first SQL database server to formulate and process distributed queries internally; users need not necessarily know or even care where the data is actually stored.

C. Modifying parser to parse commands from "system" user

The parser, in its pre-existing state, interfaces with the network in a tightly-coupled fashion. In general operation, the parser receives a command line from the network in a buffer. The parser reads and parses every character in that buffer until it reaches the end of the buffer. Upon reaching the end of the buffer, the parser calls back to its network interface (program code) for receiving the "next" buffer. As the sequence of buffers come in, the same loop in the parser executes: the parser reads/parses to the end of the buffer and then requests the next buffer. After all buffers have been retrieved, the parser reaches a point where its request for a "next" buffer is answered by the network interface indicating that no more buffers exist (i.e., in a manner similar to "fetch next, until end of file").

For a simple implementation, the system need only be able to provide the first buffer; when the parser calls back for the next buffer, the system simply need respond "none." For a simple embodiment, therefore, it is not necessary to provide context buffering, nor include programming logic for determining the "next" command buffer to fetch. Instead, a simple implementation simply instructs the parser that no further buffers exist, whereupon the parser (given its existing design) completes processing with the previously-received buffer.

The system of the present invention allows SQL commands to be stored in database tables, such as in variable-length character fields (vchar fields). The system, in turn, can fetch the rows out, one by one, and execute the logic represented by the stored text. In a callback function of the parser for getting the "next" buffer, selector logic is provided for fetching the "next" row from the table (if any) and executing it. If no remaining row is found, the selector logic indicates "end of batch." In this manner, a "database query" (i.e., to itself) can act the same as a network query (i.e., from a user). All told, the approach de-couples the system from the network in order to get the "next" information; instead, the information can come from a variety of sources, both internally and externally. This allows information to get into the parser from a variety of sources without having to change the parser itself. The parser is, in effect, "fooled" into thinking that it is receiving information the same way it always has, from the network.

D. Source code embodiment

Internal SQL commands are processed from a single entry point, internal_sql, which is a new method incorporated into the database server. This method is invoked by any internal client within the system itself wishing to issue SQL commands to the system. The method may be invoked, for instance, by an internal client seeking to upgrade the system.

In a exemplary embodiment, the internal_sql method may be constructed as follows.

```
 1:   /*
 2:   ** INTERNAL_SQL
 3:   **
 4:   ** Parse and execute a SQL string generated from within
       SQL Server.
 5:   **
 6:   **
 7:   ** Parameters:
 8:   **  cmd- ptr to the (null-terminated) SQL command we will execute
 9:   **
10:   ** Returns:
11:   **    Non-zero if the parser and sequencer both succeed;
12:   **    zero if either fails.
13:   **
14:   */
15:
16:   int
17:   internal_sql(char *cmd)
18:   {
19:   LOCALPSS(pss);           /* Get a local copy of Pss     */
20:   PROC_HDR   *newphdr;     /* Local ptr to alloced proc hdr*/
21:   int        retstat;      /* Status from parser          */
22:   int        modiobuf;     /* TRUE if I/O ptr were changed */
23:   dbid_t     dbid;         /* our current database ID     */
24:   struct {
25:       int       (*oldrcvfn) PROTO((STRMBUF *, PSS *));
26:       BYTE      *oldrcvctx;
27:       int       (*oldsendfn) PROTO((STRMBUF *, PSS *));
28:       BYTE      *oldsendctx;
29:       int       (*oldrcvflushfn) PROTO((STRMBUF *, PSS *));
30:       BYTE      *oldtcvflushctx;
31:       int       (*oldsendeomfn) PROTO((STRMBUF *,
                      PSS *));
32:       BYTE      *oldsendeomctx;
33:   } cleanup;
34:
35:   /*
36:   ** Set up the pss read function info.
37:   ** We may have to masquerade as a local process temporarily,
38:   ** since internal SQL doesn't work for remote processes; the
39:   ** RECVNEXT( ) and SENDNEXT() macros work differently
40:   ** for remote processes than they do for local connections.
41:   */
42:   cleanup.oldrcvfn = pss->precvfn;
43:   cleanup.oldrcvctx = pss->precvctx;
44:   pss->precvfn = intsql_nxchar;
45:   pss->precvctx = (BYTE *) cmd;
46:   modiobuf = intsql_sinit(pss);
47:   pss->p2stat |= P2_INTERNALSQL;
48:
49:   if (pss->pstat & P_REMPROC)
50:   {
51:       /*
52:       ** save the function pointers and initialize with
53:       ** the appropriate ones.
54:       */
55:
56:       cleanup.oldsendfn = pss->psendfn;
57:       cleanup.oldsendctx = pss->psendctx;
58:       pss->psendfn = ussflush;
59:       pss->psendctx = (BYTE *) NULL;
60:       cleanup.oldrcvflushfn = pss->precvflushfn;
61:       cleanup.oldrcvflushctx = pss->precvflushctx;
62:       pss->precvflushfn = usrflush;
63:       pss->precvflushctx = (BYTE *) NULL;
64:       cleanup.oldsendeomfn = pss->psendeomfn;
65:       cleanup.oldsendeomctx = pss->psendeomctx;
66:       pss->psendeomfn = usseom;
67:       pss->psendeomctx = (BYTE *) NULL;
68:
69:       pss->p2stat |= P2_WASREMOTE;
70:       pss->pstat &= ~P_REMPROC;
71:   }
72:
73:   /* Save the PSS context for the outer query */
74:   s_push();
75:
76:   /* allocate a PROC_HDR for the session */
77:   if ((newphdr = (PROC_HDR *) memcreate(pss)) != NULL)
78:   {
79:       /* Mark the new proc hdr as the last part used */
80:       memmark(newphdr);
81:
82:       /* Save the current database ID */
83:       dbid = pss->pcurdb;
84:
85:       /*
86:       ** Switch to using the new PROC_HDR.
87:       **
88:       **
89:       **
90:       **
91:       **
92:       **
93:       */
94:
95:           pss->phdr = newphdr;
96:
97:       /*
98:       ** Parse. The parser returns 0 if it fails. (If parser fails,
99:       ** it will generate an error message, so we don't have to.)
100:      */
101:      retstat = sqlpars();
102:
103:      /*
104:      ** If parsing succeeded, execute the query.
105:      ** If parsing failed -OR- sequencer _succeeds_, clean up the
106:      ** memory we allocated. (If sequencer fails, it will clean
107:      ** up the sequence frame for us.)
108:      **   NOTE that the test below calls the sequencer only if
109:      ** parsing succeeded -- the OR test will be true for the
110:      ** first condition if the parser fails, so we won't test the
111:      ** second condition.
112:      */
113:      if ((retstat == 0) ||             /* parser failed, OR   */
114:              (sequencer(pss->phdr)))   /* sequencer succeeded */
```

-continued

```
115:        {
116:            /* Clean up memory */
117:            s_pop(pss, NOTKILL, FALSE);
118:
119:            /* If sequencer succeeded, just check to be sure that
120:            ** there was no error -- set retstat to zero if it was
121:            ** already zero or; if Pss->plasterror != 0.
122:            */
123:            retstat = (retstat != 0) && (pss->plasterror == 0);
124:        }
125:        else if (retstat != 0)
126:        {
127:            /* sequencer() failed -- note the failure */
128:            retstat = 0;
129:        }
130:
131:        /* If required, restore our old database context */
132:        while (dbid != pss->pcurdb)
133:            closedb(USEPREV);
134:    }
135:    else
136:    {
137:        /* Couldn't get memory; restore the outer context */
138:        s_pop(pss, NOTKILL, FALSE);
139:
140:        /* RESOLVE generate a no-memory error msg */
141:    }
142:
143:    /*
144:    ** Undo the damage we did to the PSS
145:    */
146:
147:    if (pss->pstat & P2_WASREMOTE)
148:    {
149:        pss->psendfn = cleanup.oldsendfn;
150:        pss->psendctx = cleanup.oldsendctx;
151:        pss->precvflushfn = cleanup.oldrcvflushfn;
152:        pss->precvflushctx = cleanup.oldrcvflushctx;
153:        pss->psendeomfn = cleanup.oldsendeomfn;
154:        pss->psendeomctx = cleanup.oldsendeomctx;
155:
156:        pss->p2stat &= ~P2_WASREMOTE;
157:        pss->pstat |= P_REMPROC;
158:    }
159:    pss->precvfn = cleanup.oldrcvfn;
160:    pss->precvctx = cleanup.oldrcvctx;
161:    pss->p2stat &= ~P2_INTERNALSQL;
162:    if (modiobuf)
163:        intsql_sreinit(pss);
164:
165:    /* Check for attention -- abort if true */
166:    if (PSS_GOT_ATTENTION(pss, EXERATTN_064))
167:    {
168:        process intattn(pss);
169:        /* Then raise a control error to get us out of here */
170:        ex_raise(SYSTEM, SYS_ATTN, EX_CONTROL, 0);
171:    }
172:
173:    return retstat;
174: }
```

(line numbers added for clarity of the following description.)

As shown, the function or method is invoked with a single parameter, a (pointer to) character string for the command (to execute). At the outset, the method defines a local "cleanup" structure. It serves to extract context information from the global descriptor (PSS) and replace that information with values generated by the method. As a result, the method needs to cleanup after itself, for restoring the prior context (as set forth by the PSS descriptor). Specifically, the cleanup structure saves off the (pointer to) "receive function" and "receive context," and installs its own function (pointer) as the "receive function" and "receive context." These fixups are performed at lines 42–45.

At line 46, the method performs an initialization call, for invoking intsql_sinit. In the present embodiment, the initialization call serves to make sure that return results are discarded. Specifically, if the internal_sql method is invoked by a caller who does not have a network buffer, there is nowhere to send the result. Accordingly, the method adopts the approach of simply discarding the results. If, on the other hand, a network buffer exists, then results will continue to go to that client (buffer).

At line 47, the method sets a P2_INTERNALSQL flag, for indicating that the SQL command is executing for a suitably-privileged client. In effect, this gives the system (i.e., "system user") system privileges. At line 49, the method tests a special case: whether it is executing a remote procedure call (RPC). Since the requirements for receiving new data for RPC are significantly different than they are for receiving command text, the method at this point saves the function pointers (from the PSS) and initializes the PSS fields such that the internal_sql method redirects the system so that it no longer is executing an RPC but is, instead, executing a local command.

Consider the following scenario. Suppose the system is to execute a stored procedure whose job is to bring a database on-line, and that stored procedure was executed as an RPC from a remote server. Suppose further that the stored procedure brings the database on-line but the database is out of date and, thus, requires updating. This represents an RPC scenario requiring execution of a local internal command. The system must, at this point, turn off the RPC indicator; otherwise, the system will not be able to correctly get the "end of command" indicator for itself.

At line 74, the method invokes an s_push routine, for saving off the process (PSS) context. This is the same step which will be required if the system were about to begin execution of a stored procedure. At line 77, the method creates a new process context and creates memory to execute into. At line 80, the memory is marked (as that part now being used). Then, at line 101, the method invokes the parser, by calling sqlpars. In response, the parser will construct a command tree, based on the command string (which is accessible via the PSS data member). If the command has been successfully parsed, the command (command tree) is executed by the execution unit. This occurs at line 114, by the call into sequencer.

If parsing fails (i.e., the retstat data member is set equal to 0) or the sequencer (execution unit) succeeded, the method will execute cleanup steps at lines 116–123. Specifically, the method at this point cleans up the context and sets the return status. Otherwise (i.e., sequencer fails), the return status is set to "failed" (i.e., 0), at line 128. As additional cleanup, the method restores the prior (old) database context, at lines 132–133. The command being executed might have caused the system to switch databases; therefore, these steps restore the system to the prior database (based on database ID).

The "else" statement of lines 135–141 executes in the instance that memory can not be obtained (for the new processor context). In such a case, the method restores the processor context. At lines 147–163, the method returns or "puts back" the original receive functions (in the PSS context descriptor). Additionally at this point, the method turns off the "INTERNALSQL" flag (at line 161). At line 163, the method invokes a re-initialization routine, intsql_sreinit. This serves to undo items which would have been required for tasks which had a network connection (which the current INTERNAL_SQL task does not).

At lines 165–171, the method tests whether an interrupt occurred, if "yes," the method aborts and raises an exception (line 170). If no exception is raised, the method proceeds to line 173 to conclude by returning the return status (retstat).

Not shown in the above source listings is the actual callback function which the parser invokes for reading characters out of the buffer. This callback is actually invoked during the subroutine call to sqlpars. The callback is registered by storing the function address (pointer to the function) in the global context structure. When the callback is triggered, at the level of execution of sqlpars, the system will call through the registered call back (via the stored pointer).

In its present embodiment, the internal_sql function is invoked twice. On its first invocation, the function sets up the "next" byte pointer to be the "received context"—the command string. Further, it sets up the number of characters in the receive buffer to be the length of that string and it sets the "receive context" to be equal to NULL. The received context can be improved by expanding it to include or reference a context structure. As currently implemented above, the data member is employed for determining whether the current invocation of the function is also the first call. If it is the first call, the command is returned. If it is the second call, on the other hand, "end of message" is returned.

When employing a received context, the context would "grow" an indicator specifying what line of the command is currently executing or, alternatively, references a call back routine responsible for fetching the next line of the command.

Appended herewith as Appendix A are source listings providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
/*
** INTERNAL_SQL
**
** Parse and execute a SQL string generated from within SQL Server.
**
** RESOLVE What about non-ASCII character sets? What does that do to
** the character-fetch functions, since this function receives 7-bit ASCII?
**
** Parameters:
**    cmd - ptr to the (null-terminated) SQL command we will execute
**
** Returns:
**    Non-zero if the parser and sequencer both succeed;
**    zero if either fails
**
*/
int
internal_sql(char *cmd)
{
    LOCALPSS(pss);          /* Get a local copy of Pss  */
    PROC_HDR   *newphdr;    /* Local ptr to alloced proc hdr*/
    int        retstat;     /* Status from parser       */
    int        modiobuf;    /* TRUE if I/O ptr were changed */
    dbid_t     dbid;        /* our current database ID  */
    struct {
        int    (*oldrcvfn) PROTO((STRMBUF *, PSS *));
        BYTE   *oldrcvctx;
        int    (*oldsendfn) PROTO((STRMBUF *, PSS *));
        BYTE   *oldsendctx;
        int    (*oldrcvflushfn) PROTO((STRMBUF *, PSS *));
        BYTE   *oldrcvflushctx;
        int    (*oldsendeomfn) PROTO((STRMBUF *, PSS *));
        BYTE   *oldsendeomctx;
    } cleanup;
    /*
    ** Set up the pss read function info.
```

APPENDIX A-continued

```
** We may have to masquerade as a local process temporarily, since
** internal SQL doesn't work for remote processes; the
** RECVNEXT( ) and SENDNEXT() macros work differently for
** remote processes than they do for local connections.
*/
cleanup.oldrcvfn = pss->precvfn;
cleanup.oldrcvctx = pss->precvctx;
pss->precvfn = intsql_nxchar;
pss->precvctx = (BYTE *) cmd;
modiobuf = intsql_sinit(pss);
pss->p2stat |= P2_INTERNALSQL;
if (pss->pstat & P_REMPROC)
{
    /*
    ** save the function pointers and initialize with
    ** the appropriate ones.
    */
    cleanup.oldsendfn = pss->psendfn;
    cleanup.oldsendctx = pss->psendctx;
    pss->psendfn = ussflush;
    pss->psendctx = (BYTE *) NULL;
    cleanup.oldrcvflushfn = pss->precvflushfn;
    cleanup.oldrcvflushctx = pss->precvflushctx;
    pss->precvflushfn = usrflush;
    pss->precvflushctx = (BYTE *) NULL;
    cleanup.oldsendeomfn = pss->psendeomfn;
    cleanup.oldsendeomctx = pss->psendeomctx;
    pss->psendeomfn = usseom;
    pss->psendeomctx = (BYTE *) NULL;
    pss->p2stat |= P2_WASREMOTE;
    pss->pstat &= ~P_REMPROC;
}
/* Save the PSS context for the outer query */
s_push();
/* allocate a PROC_HDR for the session */
if (newphdr = (PROC_HDR *) memcreate(pss)) != NULL)
{
    /* Mark the new proc hdr as the last part used */
    memmark(newphdr);
    /* Save the current database ID */
    dbid = pss->pcurdb;
    /*
    ** Switch to using the new PROC_HDR.
    ** RESOLVE: We would like to switch the new and old
    ** PROC_HDRS, so we can switch back easily enough
    ** via s_pop() once we are done. However, s_pop() can't
    ** find the original PROC_HDR because s_push() moved it
    ** out of the way. Consequently, it raises an error. Need to teach
    ** it where to find the saved PROC_HDR for internal
    ** SQL commands.
/****  s_sw_phdr_switch(pss; newphdr); ****/
    pss->phdr = newphdr;
    /*
    ** Parse. The parser returns 0 if it fails. (If parser fails,
    ** it will generate an error message, so we don't have to.)
    */
    retstat = sqlpars();
    /*
    ** If parsing succeeded, execute the query.
    ** If parsing failed -OR- sequencer _succeeds_, clean up the
    ** memory we allocated. (If sequencer fails, it will clean
    ** up the sequence frame for us.)
    **    NOTE that the test below calls the sequencer only if
    ** parsing succeeded -- the OR test will be true for the
    ** first condition if the parser fails, so we won't test the
    ** second condition.
    */
    if ((retstat == 0) ||          /* parser failed, OR */
        (sequencer(pss->phdr)))    /* sequencer succeeded */
    {
        /* Clean up memory */
        s_pop(pss, NOTKILL, FALSE);
        /* If sequencer succeeded, just check to be sure that
        ** there was no error -- set retstat to zero if it was
        ** already zero or if Pss->plasterror != 0.
        */
        retstat = (retstat != 0) && (pss->plasterror == 0);
    }
    else if (retstat != 0)
```

APPENDIX A-continued

```
        {
            /* sequencer() failed -- note the failure */
            retstat = 0;
        }
        /* If required, restore our old database context */
        while (dbid != pss->pcurdb)
            closedb(USEPREV);
    }
    else
    {
        /* Couldn't get memory; restore the outer context */
        s_pop(pss, NOTKILL, FALSE);
        /* RESOLVE generate a no-memory error msg */
    }
    /*
    ** Undo the damage we did to the PSS
    */
    if (pss->pstat & P2_WASREMOTE)
    {
        pss->psendfn = cleanup.oldsendfn;
        pss->psendctx = cleanup.oldsendctx;
        pss->precvflushfn = cleanup.oldrcvflushfn;
        pss->precvflushctx = cleanup.oldrcvflushctx;
        pss->psendeomfn = cleanup.oldsendeomfn;
        pss->psendeomctx = cleanup.oldsendeomctx;
        pss->p2stat &= ~P2 WASREMOTE;
        pss->pstat |= P_REMPROC;
    }
    pss->precvfn = cleanup.oldrcvfn;
    pss->precvctx = cleanup.oldrcvctx;
    pss->p2stat &= ~P2_INTERNALSQL;
    if (modiobuf)
        intsql_sreinit(pss);
    /* Check for attention -- abort if true */
    if (PSS_GOT_ATTENTION(pss, EXERATTN_064))
    {
        process_intattn(pss);
        /* Then raise a control error to get us out of here */
        ex_raise(SYSTEM, SYS_ATTN, EX_CONTROL, 0);
    }
    return retstat;
}
/*
** INTSQL_NXCHAR
**
** Get the nextcharacter from an internally-generated SQL string. These
** strings are always ASCII-7 characters, and never require translation.
**
** Parameters:
**    buf - ptr to the stream buffer holding the input text
**    pss - process structure.
**
** Returns:
**    BSIO_SUCCESS if there is more text to parse
**    BSIO_EOM otherwise
*/
SYB_STATIC int
intsql_nxchar(STRMBUF *buf, PSS *pss)
{
    /* If we already read the string, we're done */
    if (pss->precvctx == (BYTE *) NULL)
    {
        buf->ststatus |= STEOM;
        return BSIO_EOM;
    }
    /*
    ** Set up the local string as the input packet, then clear the
pointer
    ** to the local string so we don't keep getting it over and over.
    */
    buf->stphysmem.pnb = pss->precvctx;
    buf->stphysmem.pleft = strlen((char *) buf->stphysmem.pnb);
    pss->precvctx = (BYTE *) NULL;
    return BSIO_SUCCESS;
}
/*
** INTSQL_SINIT
**
** Ensure that the STRMBUF is set up for internal SQL's output. If this
** task has no network connection; we want to ensure that the results are
** sent to the bit bucket rather than causing seg faults.
**
** This code was adapted liberally from the threshold manager.
**
** Parameters:
**    pss - ptr to the PSS that we will be setting up
**
** Returns:
**    TRUE if this function set up the network translation functions
**    FALSE otherwise
*/
SYB_STATIC SYB_BOOLEAN
intsql_sinit(PSS * pss)
{
    STRMBUF     *buf;
    LOGINREC    *loginrec;
    SYB_BOOLEAN retval;
    /* Initially, *assume we will change nothing */
    retval = FALSE;
    /* Use local discard buffer for tasks having no net connection */
    if (pss->pnetbufp == (unsigned char *) NULL)
    {
        buf = pss->psendbuf;
        buf->stphysmem.pnb = Fake_netbuf;
        buf->stphysmem.pleft = sizeof (Fake_netbuf);
        /* Set up data transfer functions to transfer to /dev/null */
        loginrec = Pss->ploginrec;
        MEMZERO(loginrec, sizeof (*loginrec));
        loginrec->lint4 = XFER_VOID;
        loginrec->lint2 = XFER_VOID;
        loginrec->lflt4 = XFER_VOID;
        loginrec->lflt = XFER_VOID;
        loginrec->lchar = XFER_VOID;
        loginrec->ldate4 = XFER_VOID;
        loginrec->ldate = XFER_VOID;
        init_translate(loginrec);
        /* We set up the translation functions */
        retval = TRUE;
    }
    /* Return a flag showing whether we changed anything */
    return retval;
}
/*
** INTSQL_SREINIT
**
** This function is called at the end of internal SQL processing, in order
** to undo the changes made by intsql_sinit().
**
** Parameters:
**    pss - ptr to the PSS that we will be resetting
**
** Returns:
**    void
*/
SYB_STATIC void
intsql_sreinit(PSS * pss)
{
    STRMBUF     *buf;
    /* Use local discard buffer for tasks having no net connection */
    if (pss->pnetbufp == (unsigned char *) NULL)
    {
        buf = pss->psendbuf;
        buf->stphysmem.pnb = buf->stphysmem.pstart.pbuf;
        buf->stphysmem.pleft = 0;
        /* it isn't necessary to change the data transfer functions */
    }
    return;
}
```

What is claimed is:

1. In a database system having a parser for parsing command statements and an execution unit for executing instructions based on parsed command statements, a method for executing system-created internal command statements, the method comprising:

creating a command buffer comprising a command statement which is internally generated by the database system itself;

setting an internal status flag for indicating to the database system that the internally-generated command statement is from a client with system privileges;

invoking said parser for parsing said command buffer for generating a parsed command statement; and at said execution unit, executing instructions based on said parsed command statement with system privileges, whereupon said database system operates under control of the executing internally-generated command statement.

2. The method of claim 1, wherein said internally-generated command statement comprises at least one structured query language (SQL) statement.

3. The method of claim 1, wherein said command buffer is created by dynamically constructing an internally-generated command statement.

4. The method of claim 1, wherein said internally-generated command statement is created based at least in part on information retrieved from a database table.

5. The method of claim 4, wherein said information stored in a database table comprises a text string stored in a variable-length character field of a row from the database table.

6. The method of claim 1, wherein said internally-generated command statement comprises one or more data manipulation statements which perform transactional operations against one or more database tables.

7. In a database system having a parser for parsing command statements and an execution unit for executing instructions based on parsed command statements, a method for executing system-created internal command statements, the method comprising:

creating a command buffer comprising a command statement which is internally generated by the database system itself;

setting an internal status flag for indicating to the database system that the internally-generated command statement is from a client with system privileges;

invoking said parser for parsing said command buffer for generating a parsed command statement; and at said execution unit, executing instructions based on said parsed command statement with system privileges, whereupon said database system operates under control of the executing internally-generated command statement, wherein said parser also parses command statements received from clients connected to the database system.

8. In a database system having a parser for parsing command statements and an execution unit for executing instructions based on parsed command statements, a method for executing system-created internal command statements, the method comprising:

creating a command buffer comprising a command statement which is internally generated by the database system itself;

setting an internal status flag for indicating to the database system that the internally-generated command statement is from a client with system privileges;

invoking said parser for parsing said command buffer for generating a parsed command statement; and at said execution unit, executing instructions based on said parsed command statement with system privileges, whereupon said database system operates under control of the executing internally-generated command statement, wherein said internally-generated command statement comprises at least one structured query language (SQL) statement for performing an upgrade of the database system, so that the system can be automatically upgraded without providing a standalone upgrade utility having system privileges.

9. The method of claim 1, further comprising:

repeating said invoking step and said executing step for a plurality of command buffers, so that the database system operates under control of a sequence of internally-generated command statements.

10. In a database system having a parser for parsing command statements and an execution unit for executing instructions based on parsed command statements, a method for executing system-created internal command statements, the method comprising:

creating a command buffer comprising a command statement which is internally generated by the database system itself;

setting an internal status flag for indicating to the database system that the internally-generated command statement is from a client with system privileges;

invoking said parser for parsing said command buffer for generating a parsed command statement; and at said execution unit, executing instructions based on said parsed command statement with system privileges, whereupon said database system operates under control of the executing internally-generated command statement, wherein said invoking step includes:

automatically generating an "end of buffer" message for said parser, so that said parser begins parsing said internally-generated command statement without awaiting receipt of additional buffers.

11. A database system capable of operating as a "system" user, the system comprising:

a database server having a parser for parsing command statements and an execution unit for executing instructions based on parsed command statements;

a memory for storing a command buffer comprising a command statement which is internally generated by the database system itself, and for storing an internal flag for indicating to the database system that the internally-generated command statement is from a user with system privileges;

means for invoking said parser for parsing said command buffer for generating a parsed command statement; and means for executing with system privileges instructions based on said parse command statement at said execution unit, so that said database system operates under control of itself as a "system" user.

12. The system of claim 11, wherein said internally-generated command statement comprises at least one structured query language (SQL) statement.

13. The system of claim 11, wherein said command buffer is created by dynamically constructing an internally-generated command statement.

14. The system of claim 11, wherein said internally-generated command statement is created based at least in part on information retrieved from a database table.

15. The system of claim 14, wherein said internally-generated information stored in a database table comprises a text string stored in a variable-length character field of a row from the database table.

16. The system of claim 11, wherein said internally-generated command statement comprises one or more data manipulation statements which perform transactional operations against one or more database tables.

17. A database system capable of operating as a "system" user, the system comprising:

a database server having a parser for parsing command statements and an execution unit for executing instructions based on parsed command statements;

a memory for storing a command buffer comprising a command statement which is internally generated by the database system itself, and for storing an internal flag for indicating to the database system that the internally-generated command statement is from a user with system privileges;

means for invoking said parser for parsing said command buffer for generating a parsed command statement; and means for executing with system privileges instructions based on said parse command statement at said execution unit, so that said database system operates under control of itself as a "system" user, wherein said parser also parses command statements received from clients connected to the database system.

18. The system of claim 11, wherein said internally-generated command statement comprises at least one structured query language (SQL) statement for performing an upgrade of the database system, so that the system can be automatically upgraded without providing a standalone upgrade utility having system privileges.

19. A database system capable of operating as a "system" user, the system comprising:

a database server having a parser for parsing command statements and an execution unit for executing instructions based on parsed command statements;

a memory for storing a command buffer comprising a command statement which is internally generated by the database system itself, and for storing an internal flag for indicating to the database system that the internally-generated command statement is from a user with system privileges;

means for invoking said parser for parsing said command buffer for generating a parsed command statement;

means for executing with system privileges instructions based on said parse command statement at said execution unit, so that said database system operates under control of itself as a "system" user; and means for repeating invocation and execution for a plurality of command buffers, so that the database system operates under control of a sequence of internally-generated command statements.

20. A database system capable of operating as a "system" user, the system comprising:

a database server having a parser for parsing command statements and an execution unit for executing instructions based on parsed command statements;

a memory for storing a command buffer comprising a command statement which is internally generated by the database system itself, and for storing an internal flag for indicating to the database system that the internally-generated command statement is from a user with system privileges;

means for invoking said parser for parsing said command buffer for generating a parsed command statement; and means for executing with system privileges instructions based on said parse command statement at said execution unit, so that said database system operates under control of itself as a "system" user, wherein said invoking means includes:

means for automatically generating an "end of buffer" message for said parser, so that said parser begins parsing said internally-generated command statement without awaiting receipt of additional buffers.

* * * * *